US005889562A

United States Patent [19]
Pau

[11] Patent Number: 5,889,562
[45] Date of Patent: Mar. 30, 1999

[54] MEMORY REQUIREMENT REDUCTION IN A SQTV PROCESSOR BY ADPCM COMPRESSION

[75] Inventor: Danilo Pau, Sesto S. Giovanni, Italy

[73] Assignee: SGS-Thomson Microelectronics, S.r.l., Agrate Brianza, Italy

[21] Appl. No.: 810,029

[22] Filed: Mar. 4, 1997

[30] Foreign Application Priority Data

Mar. 20, 1996 [EP] European Pat. Off. .............. 96830134

[51] Int. Cl.⁶ ..................................................... H04N 7/01
[52] U.S. Cl. ........................... 348/447; 348/459; 348/453
[58] Field of Search .................................. 348/447, 459, 348/453, 450, 448, 910

[56] References Cited

U.S. PATENT DOCUMENTS

| 5,014,119 | 5/1991 | Faroudja | 348/448 |
| 5,182,643 | 1/1993 | Futscher | 348/447 |
| 5,257,103 | 10/1993 | Vogeley | 348/450 |
| 5,510,843 | 4/1996 | Keene et al. | 348/447 |
| 5,526,055 | 6/1996 | Zhang et al. | 348/453 |

FOREIGN PATENT DOCUMENTS 0 624 032 A3  5/1994  European Pat. Off. .........  H04N 7/13

OTHER PUBLICATIONS

Hiroshi Miyaguchi et al., *IEEE 1990 Proceedings of the International Conference on Consumer Electronics (ICCE)*, "Digital TV With Serial Video Processor" (Jun. 6–8, 1990), pp. 324–325.
Viviana D'Alto et al., *IEEE 1994 Custom Integrated Circuits Conference*, "Multipurpose Scanning Rate Converter IC for Improved Quality Television" (May 1–4, 1994), pp. 111–113.

*Primary Examiner*—Victor R. Kostak
*Attorney, Agent, or Firm*—Allen, Dyer, Doppelt, Milbrath & Gilchrist, P.A.

[57] ABSTRACT

An SQTV processor is for converting a video signal received at an interlaced scanning frequency of 50 or 60 Hz to an interlaced scanning frequency of 100 or 120 Hz, respectively, and implementing algorithms for noise filtering and of edge definition. The process includes: an analog-digital converter (ADC) of analog input signals of luminance and chrominance; at least a field memory (FIELD MEMORY_1), or more preferably two similar field memories, where digital blocks of luminance (Y) value and blocks of values of each one of the two chrominance (U, V) components of the converted video signals are stored; one "First-In-First-Out" (LINE MEMORY) register for digital values read from the field memory containing the pixels of a whole line of each field; a noise filtering block (NOISE REDUCTION); a sampling frequency converter (SRC) of the fields from 50 or 60 Hz to 100 or 120 Hz; a conversion circuit for the vertical format (VFC), an edge definition (PE) enhancement circuit; and a digital-to-analog converter (DAC) of the processed luminance and chrominance (YUV) signals. The processor further includes a compressing and coding circuit for the converted video signals according to an adaptive differential pulse code modulation (ADPCM) scheme of the digital values to be stored in the field memory (FIELD MEMORY_1) and an ADPCM decoding and decompressing circuit for data read from the field memory (FIELD MEMORY_1). The significative reduction of the total memory requisite produced by the ADPCM pre-compression makes the entire system more readily integratable on a single chip.

9 Claims, 11 Drawing Sheets

MEMORY REQUIREMENT REDUCTION IN A SQTV PROCESSOR BY ADPCM COMPRESSION

FIELD OF THE INVENTION

The present invention relates to digital processing systems for video signals received to display images on a TV screen, and, more particularly, to an integrated system, generally known as "Improved Quality Television processor" (IQTV) or "Smart Quality Television processor" (SQTV), requiring storing of whole pictures or parts of them in the decoding phase.

NTSC, SECAM) carrying out the separation of luminance and chrominance components.

Analog signals relevant to luminance (Y) and chrominance (UV) are thus converted through appropriate analog-to-digital converters so to produce a luminance (Y) digital data stream and a chrominance (UV) digital data stream which are fed to the IQTV_IC (or SQTV-IC) device). Each FIELD MEMORY may store a picture field in the 4:2:2 format or in the 4:1:1 format, thus occupying the following memory space

| PAL | 720 × 288 × 8 for luma (luminance) (Y) | 1,658,880 bits | =3,317,760 bits |
|---|---|---|---|
| | 350 × 288 × 8 for U chroma (chrominance U) | 829,440 bits | |
| | 360 × 288 × 8 for U chroma (chrominance V) | 829,440 bits | |
| NTSC | 720 × 240 × 8 for luma (luminance) (Y) | 1,382,400 bits | =2,764,800 bits |
| | 360 × 240 × 8 for U chroma (chrominance U) | 691,200 bits | |
| | 360 × 240 × 8 for chroma (chrominance V) | 691,200 bits | |

BACKGROUND OF THE INVENTION

These IQTV and SQTV integrated systems are ever more largely employed in video receivers to improve image quality without requiring changes in the relevant transmission standards (PAL, NTSC, SECAM). In practice, luminance (Y) and chrominance-U and chrominance-V (UV) analog components of the video signal are digitized through relevant analog-to-digital converters. The digital data obtained, concerning the two fields into which the video signal is generally divided, are stored in a dedicated memory. This allows, first, a conversion from 50 or 60 Hz to 100 or 120 Hz of the interlaced scanning frequency (in practice the so-called "refresh-rate") so to make flickering imperceptible.

Moreover, digital values relevant to each pixel of each line forming each field so stored in the memory, enable implementation of appropriate algorithms for reducing gaussian and spike or pulse noise. Through memory duplication, it is also possible to implement a compensation (elimination) loop of blurring of objects moving fast on a background, employing an algorithm that contemplates the calculation of average values among the values of pixels relating to successive pictures so to eliminate non-correlated contents of the video signal and correction algorithms based on motion detection.

In general, the field memory or memories are DRAM devices which according to the present limits of manufacturing technologies, are external to the integrated device containing the processing circuits (generally called SQTV_IC or IQTV_IC). A common video receiver includes a tuning section, that selects the channel and the relevant frequency band of the signal transmitted via cable, satellite, or from ground-based stations. The tuner converts the received signal to an intermediate video frequency (for example 38.9 Mhz according to the Italian standard) containing luminance and chrominance data multiplexed in frequency. A demodulation block processes the signal converted at intermediate frequency, producing a base band composite video signal, which is selected by a selector of the input signal source and feeds the standard decoder (PAL, In the case of a PAL transmission system which, being the more critical standard, can be taken as reference example, the total requisite, when employing two field memories becomes 3,317,760*2=6,635,520 bits. There is the need or usefulness to reduce this memory requisite of a SQTV_IC (or IQTV_IC) without causing a perceivable visual deterioration of images. A reduction in the memory requisite may save costs and/or create more suitable premises for the integration of the field memory in the same IQTV_IC (or SQTV_IC) chip, through advancements of manufacturing processes.

SUMMARY OF THE INVENTION

The system of the invention is based on compressing and coding according to an adaptive differential pulse code modulation scheme (ADPCM) the digital data relevant to a field in a 4:2:2 or in a 4:1:1 format of a picture to be stored in the relevant field memory at a 50 or 60 Hz standard frequency. The system is further based on ADPCM decoding and decompressing the data read from the field memory at a multiple frequency (generally double) the frequency at which the data are written in the field memory.

The ADPCM compression mechanism takes advantage of the correlation existing between adjacent pixel values of a picture to reduce the number of bits required for a binary representation of the picture itself. In fact, it is possible to approximate the pixel values, by suitably combining only the value of pixels adjacent thereto (therefore, not using (storing) the actual pixel value), that is by implementing a so-called "prediction" of the pixel itself. Therefore it is possible to reduce the quantity of binary figures required for the digital representation of a picture by defining the prediction mechanism, and, therefore, duly coding (and storing) the prediction error only instead of each pixel. The more accurate the prediction of the pixel value, the lower the entropy of the prediction error, or the lower the number of bits required to code it.

The method of the invention enables in practice a reduction to less than a half the RAM memory requisite for the storing of the field or fields used, with an almost negligible loss in the quality of reconstructed images because artifacts are mainly distributed at high frequencies.

BRIEF DESCRIPTION OF THE DRAWINGS

The various aspects and advantages of the invention will be even more evident through the following description of some important embodiments and referring to the attached drawings, wherein.

DETAILED DESCRIPTION OF PREFERRED EMBODIMENTS

Figure 1:
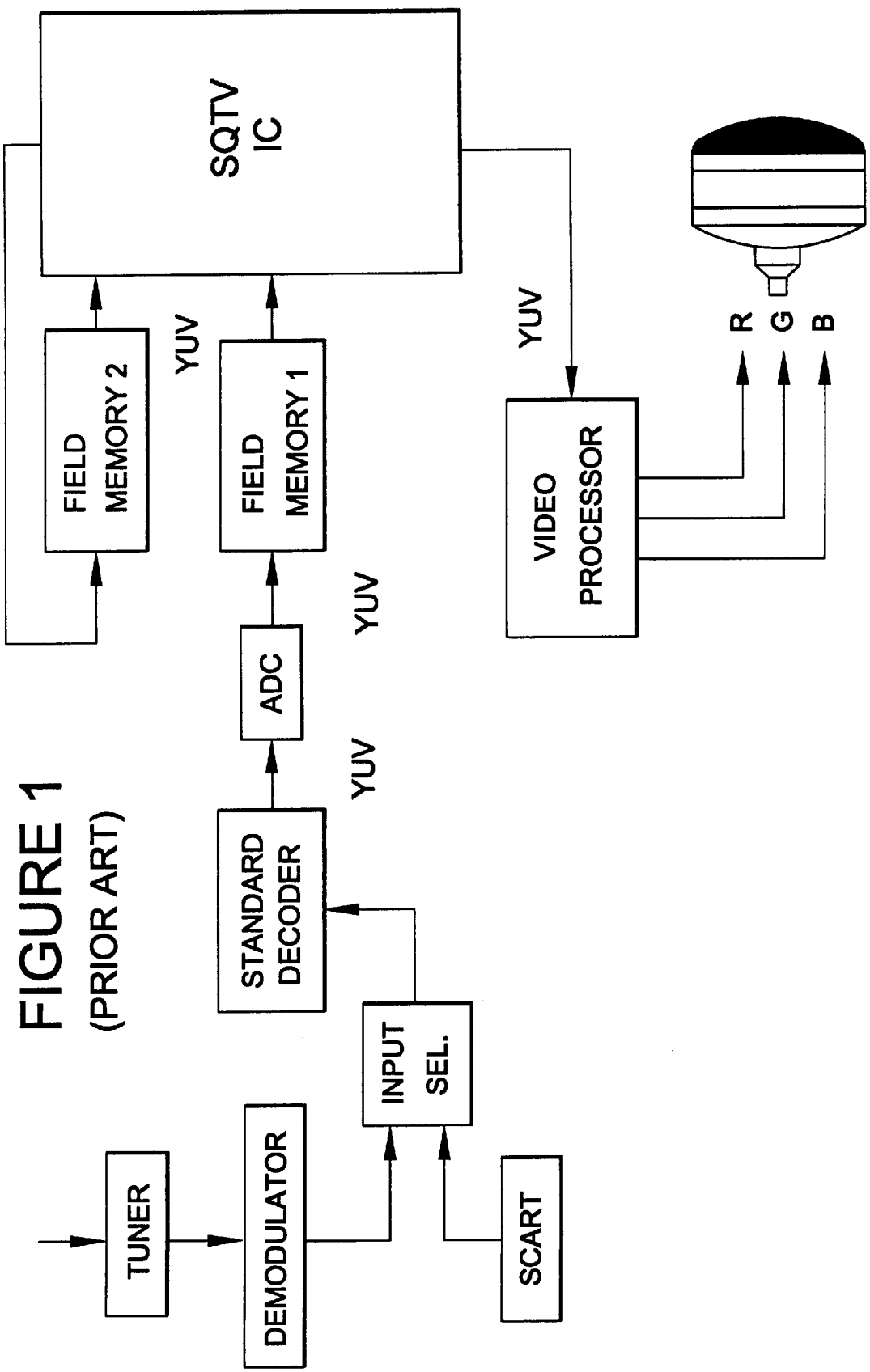
FIG. 1 is a block diagram of a video receiver of the prior art including a digitized picture processing system.

FIG. 1 shows a typical functional block diagram of a video receiver. The tuner (TUNER) selects the channel and the relevant frequency band (for instance RAI2 471 Mhz) and produces a signal converted at a video intermediate frequency (for instance at 38.9MHz according to the Italian standard) containing the luminance and chrominance signals, multiplexed in frequency.

The demodulating block (DEMODULATOR) processes the tuner signal converted at intermediate frequency and produces a base band composite video signal at its output. Through an input selector (INPUT SEL), the source of video signal (for instance coming from the antenna or cable or from a SCART socket) is selected.

The decoder (STANDARD DECODER) separates the luminance and chrominance components of the composite video signal according to the particular transmission standard (PAL, NTS or SECAM) and sends them to the relevant analog-to-digital converters, represented as a whole in the diagram by the ADC block. Analog-to-digital converters produce a digital stream of luminance (Y) values and a digital stream of chrominance-U and chrominance-V (UV) values which are fed to the SQTV_IC processor which, according to the example considered, communicates with the two field memories (FIELD MEMORY_1 and FIELD MEMORY_2).

The SQTV_IC processor can be programmed in order to manage data, alternatively formatted in a 4:1:1 or in a 4:2:2 format. After processing, luminance (Y) and chrominance (UV) components are reconverted by the relative digital-to-analog converters and fed to the inputs of the VIDEO PROCESSOR block for generating deflection signals (RGB).

The chip SQTV_IC may be, for instance, the PQFP100 device described in the preliminary datasheet (December 1995 edition) of SGS-THOMSON MICROELECTRONICS, whose entire content is incorporated herein by reference. The two field memories FIELD MEMORY_1 and FIELD MEMORY_2 may be implemented in an external DRAM device or integrated in the SQTV_IC chip.

The function performed by the FIELD MEMORY_1 includes storing a video field every 20 ms (in the case of 50 Hz PAL standard). This implies that the next field replaces the previous one after 20 ms. Field doubling is obtained by reading the content of the FIELD MEMORY_1 every 10 ms. Therefore in the first 10 ms after a field storing, the field is completely read in a "raster" format. In the successive 10 ms, prior to storing of a new field, the previous field is read for a second time in "raster" format. This method of operation can be implemented by employing a random access memory (commonly a DRAM) or a sequential access memory (generally called FIFO) where the first datum stored is the first to be read and so forth for all data after the first one. Practically, the FIELD MEMORY_2 is used as a field delay, to enable field interpolations for desirably eliminating pulse and gaussian noise.

Figure 2:
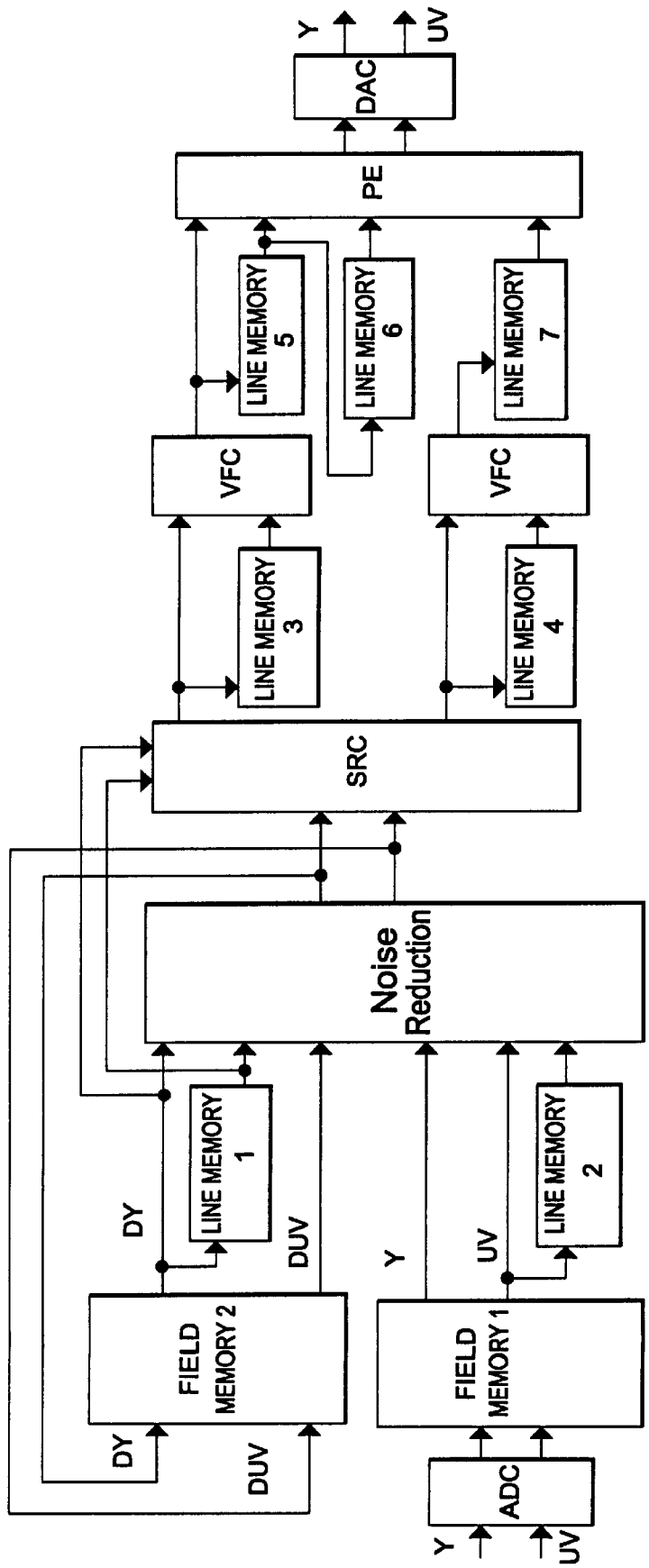
FIG. 2 shows an example of the prior art architecture of the circuitry for the analog-to-digital conversion, digital processing and digital-to-analog reconversion of Y U V components of the video images.

The whole functional diagram of the processing section included in the SQTV_IC is shown more in detail in FIG. 2. According to a well known architecture, such as that shown in FIG. 2, data relevant to the Y (luminance) and UV (chrominance U and chrominance V) components are written in the field memory FIELD MEMORY_1 in a pre-set format (4:1:1 or 4:2:2) at a writing frequency of 50 (or 60), or 50 or 60 Hz and are read at double that frequency.

The LINE MEMORY_1 block is a buffer, of the so-called "First-In-First-Out" type, capable of delaying each pel (short for pixel) of a scan line of the video picture by a time equal to the "transit" time of a whole line of pixels. This allows the feeding of pairs of pixels belonging to successive scanning lines and occupying the same position in the line scan (that is they are adjacent to each other in an orthogonal direction to the scan lines) to the relevant inputs of the NOISE REDUCTION block. In the example considered, a second field memory is also present, FIELD MEMORY_2, to allow implementation of filtering algorithms of non-correlated information between two successive image fields so to eliminate (filter) the (non-gaussian) pulse noise, according to techniques that are well known to a skilled practitioner.

In practice, correction algorithms for the elimination of undesired or noisy effects of different origin and type can be implemented in the block generally called NOISE REDUCTION. This is possible by virtue of the digitization of the video signal components and their storing at the standard (50 or 60 Hz) transmission frequency, and, therefore, of the possibility to read data stored at a multiple frequency and perform proceeding suitable for compensating and eliminating undesired effects of a different nature and source, as they occur, depending on the video input signal source.

Briefly, an SQTV processor includes a sampling frequency of pictures converter SRC (Sampling Rate Converter), compressing/coding networks as represented in the diagram by the two VFC (Vertical Format Converter) blocks and by the PE (Picture Enhancement) block to emphasize edge definition of pictures, preceded by a "First-In-First-Out" buffer network (LINE MEMORY 5, 6 and 7) to realize work windows on a certain number (3) of scan lines of the video picture. The block further includes digital-to-analog converters (DACs) for re-converting the luminance (Y) and chrominance (UW) processed digital streams into corresponding analog signals relative to the three components to be fed to the VIDEO PROCESSOR block which generates the deflection signals (RGB).

Figure 3:
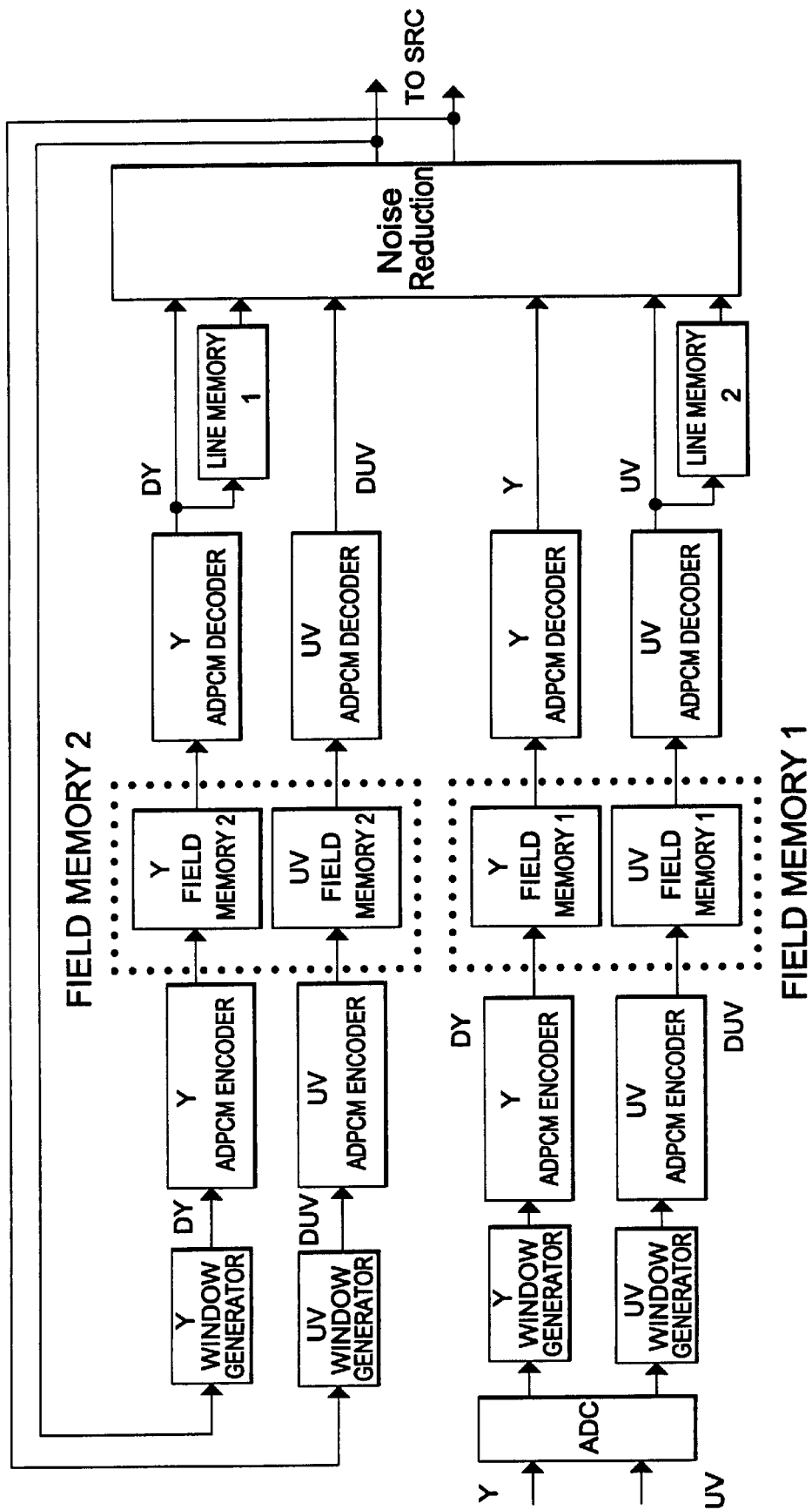
FIG. 3 is a partial diagram showing the architecture modified according to the present invention.

In an SQTV system of the conventional type, for instance as that described in FIG. 2, the invention may be implemented by modifying the architecture of the input digital data storing section. According to an embodiment of the invention, the architecture of this section of the SQTV processing system of FIG. 2 is shown in FIG. 3. Basically, the architecture of the invention includes, for each digital stream, a compressing and coding block (ADPCM Encoder) of data to be written in the relevant field memory, FIELD MEMORY_1 and FIELD MEMORY_2 and an ADPCM decoding and decompressing block (ADPCM Decoder) of the data read from the memory.

Conveniently, for each digital stream to be compressed according to an adaptive differential pulse code modulation scheme (ADPCM) before being written in a relevant field memory, it is useful to create suitable work windows. The work windows are created by apportioning in practice each picture (field) into a plurality of areas in order to optimize the management of data during the various phases of compressing, coding, writing in memory, reading, decoding and decompressing.

Focusing now our attention on the FIELD MEMORY_1, and assuming storage of PAL fields at a frequency of 50 Hz, to be read at a double frequency of 100 Hz, and referring to the diagram in FIG. 3 we can notice the following. The field stored in the Y buffer of the FIELD MEMORY_1 of the diagram in FIG. 3, is made up of the sequence of 288 video lines, each one of them consisting of 720 luminance pels. These lines are used by the WINDOW GENERATOR circuit block to create a work window for carrying out a compression. This window or picture area is compressed by the Y_ADPCM_Encoder block and then stored in the Y_FIELD MEMORY_1. At the memory output, this windows is decompressed in "raster" mode without the aid of a delay buffer of the "First-In-First-Out" type, by the Y_ADPCM_Decoder block.

Figure 4:
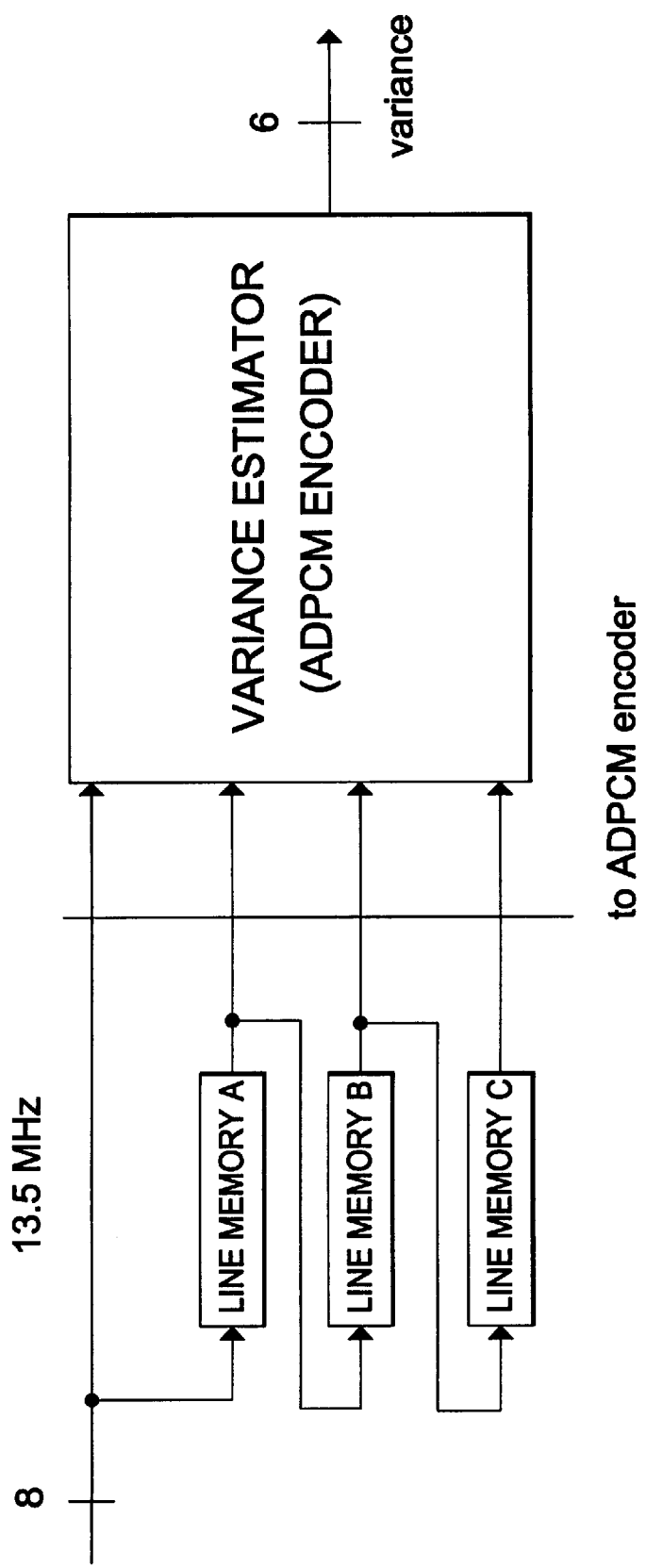
FIG. 4 is a diagram of a Window Generator block of the diagram in FIG. 3.
Figure 5:
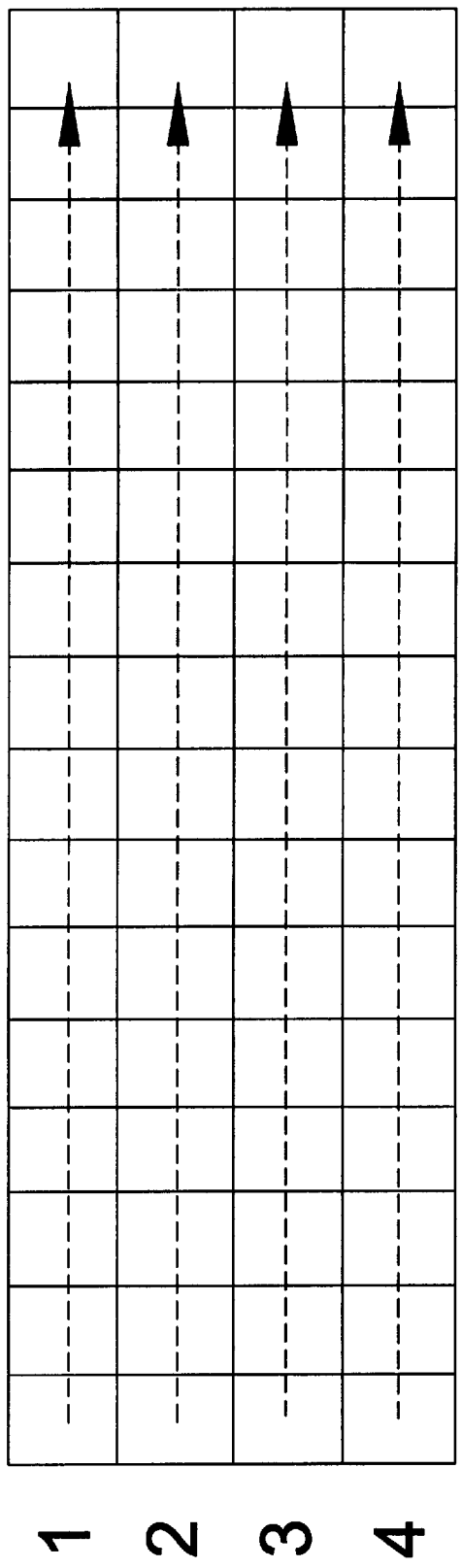
FIG. 5 is a diagram showing the ordering in the scanning of pixels of each block for a work windows defined by four lines.

FIG. 4 shows the circuit diagram of each WINDOW GENERATOR block. By assuming for instance working on a window consisting of 16 pels per line and to be using 4 lines, as shown in FIG. 5, in view of the fact that the WINDOW GENERATOR is fed by video lines in the "raster" sequential mode, "First-In-First-Out" memories (LINE MEMORY) are required for delaying each pels of a video line for a time equal to the "transit" time of the whole line through the buffer. Three of these memories are required for the construction of the 4-line window.

Each line feeds the VARIANCE ESTIMATOR block with 16 pels at a time and aligned on the same vertical line. This block calculates the differences, as absolute values, among consecutive pels belonging to a window having a horizontal width equal to 16 pels. Four partial sums are thus obtained at the same time. The sum of the four values is the expected total sum.

This solution is preferable for multiplexing the four lines pels (upstream of the VARIANCE ESTIMATOR) because multiplexing would increase the operational frequency from 13.5 Mhz to 54 Mhz, which is inconvenient for practical implementation. These pels feed the ADPCM Encoder. Each PAL field is thus divided into rectangular blocks having 16*4 size, or more in general a R×C size (R lines and C columns). The maximum effectiveness of compression is obtained when R and C are selected, respectively, among integer dividers of the picture size.

The algorithm implemented by the ADPCM Encoder operates the compression of each block, that is, a reduction of the number of bits required for the digital representation thereof, employing only information obtained from the block itself. This simplifies access to the block in the compressed data stream, as well as decompression of the block. Therefore by defining an ordering of the scanning of pixels of each block, such that for each pixel, except for the first one of each line, there exists a preceding one, which can be used as predictor of the pixel itself, and by assuming that P (i, j), i=1, . . . , R and i=1, . . . , C, is the pixel of line i and column j of a generic block, and P' (i, j) is the pixel used as predictor of P(i, j), the sequence of FIG. 5 is defined as follows:

P (i, 1), i=first scanned pixel of each line i=1, . . . , R

P' (i, j)=P(i, j−1); i=1, . . . , R and j=2, . . . , C

Therefore by defining E(i, j)=P(i, j)−P' (i, j) as the prediction error, it is known that the set of the prediction errors has a statistical description which can be well approximated by a sequence of random and equally distributed independent variables having a Laplacian probability density. By exploiting this prior information of the prediction error, it is possible to compress the latter by mapping it on a small set of values Q(k), k=1, . . . , L and L<$2^B$, without introducing excessive distortion. This mapping operation is called quantization.

By assuming that each one of the L values Q(k) can be coded with a C number of bits lower than B (this being absolutely true when e.g. L=<$2^C$), the binary coding of each pixel submitted to the predictive process results in compression by a C/B factor. The ADPCM compression method is applied to each one of the blocks in which the picture is divided through the following operations:

1) selection and coding in the digital stream of a suitable quantizer;

2) coding of the first pixel of each block line;

3) decorrelation, quantization and coding of all the following pixels of the block.

Selection and Coding of the Quantizer

It is well known that distortion introduced by the quantization process can be reduced if all quantization values Q(k) are calculated by considering the power of the signal to be quantized. It is also known that different portions of a digital picture may show very different power values. The present method defines the set of Q(k) values relevant to each block depending on the power of the block itself, as follows:

the set of Q1(k) k=1, . . . , L values used in case of unit power, is known both to the encoder and to the decoder;

the power U of the block is estimated and coded in the digital stream; and

Q(k) values actually used for the block are calculated as:

$$Q(k)=Q1(k)*U; k=1,\ldots,L$$

The evaluation of the block power can be simply made in the Laplacian statistical hypothesis of the prediction error. In fact, in this case the power can be calculated by multiplying the mean of absolute values of the block prediction errors by the square root of two. Power coding can be made simply by scaling about the maximum value and by representing the result on a number of bits K, thus essentially realizing an even quantization.

In selecting the prediction error quantizer the peak value of the quantization error must be taken into account too, because in the case of large prediction errors it could happen that the maximum value rendered by the quantizer, according to the diagram shown below, be too small. Therefore, simultaneous to the variance calculation, also the peak values of the prediction error are calculated for each group G of horizontal consecutive lines (e.g. G=2). One bit for each one of these groups of pixels is added to the coding, to signal the occurrence of an excessive peak of the prediction error and, consequently a quantizer corresponding to a 2*U power in case of a pair of lines being selected.

Coding of the First Pixel of Each Line of the Block

The first pixel of the block, indicated above as P(i, 1) is not subject to any prediction and therefore it is coded according to its original resolution by a number B of bits. Compared to the known technique, the scanning path of the window is modified. This permits adaptation of the decompression to the need of obtaining the raster format at output of the FIELD MEMORY.

Decorrelation. Quantization and Coding of All the Other Pixels of the Block

For each pixel P of the block, the pixel P' is adopted as a predictor according to what was defined above. It must be noticed that this predictor, following the scanning order shown, has already been quantized and reconstructed, and, therefore, is not obtained from the original picture. This permits an enhanced quality control of the picture, consistent with the ADPCM technique.

Example of Compression at N Bits Per Pixel

With reference to the scanning example shown in FIG. 5, a block R*C of pixels after the WINDOW GENERATOR block is taken in consideration. The total bits employed for the block compression are equal to:

$$K+(8*R)+(R*C-1)*N+R/G$$

where:

K=bits employed for power coding.

8=bits employed for the first pixel in the scanning of each line.

N=bits employed for quantization (R*C−1) * N=bits employed for DPCM coding of the remaining pixels R/G=bits to signal the altered quantizer in the R/G groups of lines In the case: K=6, R=4, C=16, N=4, G=2 the following total is obtained:

$$6+8*4+(4*16-1)*4+4/2=280 \text{ bits/block}$$

In the case: K=6, R=4, C=16, N=3, G=2 the following total is obtained:

$$6+8*4+(4*16-1)*3+4/2=220 \text{ bits/block}$$

versus 4*16*8=512 bits requested by the original representation.

Example of Compression of a PAL 4:2:2 Field

Each field consists of 3,240, 4*16 luminance blocks and of 1,620, 4*16 blocks for each chrominance component. Each luminance and chrominance block is coded with a number of bits equal to (4*16*8)=512 bits.

Each field, broken down into blocks, occupies the following number of bits:

| | |
|---|---|
| Y component [(720*288)/(4*16)] * 512 = | 1,658,880 bits |
| U component [(360*288)/(4*16)] * 512 = | 829,400 bits |
| V component [(360*288)/(4*16)] * 512 = | 829,400 bits |
| Total: | 3,317,760 bits |

On the contrary, considering for instance a 4 bit/pixel compression of luminance and a 3 bit/pixel of chrominance, we would obtain:

| | |
|---|---|
| Y component [(720*288)/(4*16)] * 280 = | 907,200 bits |
| U component [(360*288)/(4*16)] * 220 = | 356,400 bits |
| V component [(360*288)/(4*16)] * 220 = | 356,400 bits |
| Total: | 1,620,000 bits | the compression factor obtained is equal to 2,048, thus enabling a 50% compression of each field.

Example of Decompression of a PAL 4:2:2 Field

Figure 6:
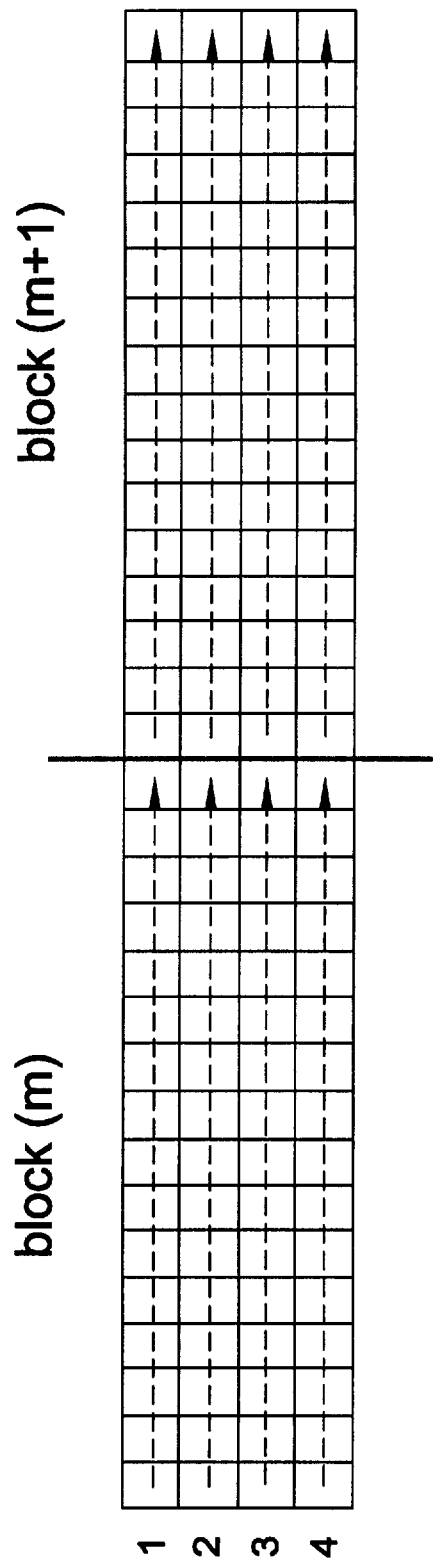
FIG. 6 is a diagram showing the scanning of data per blocks in a work window defined by four lines.

During the decompression phase, the raster format must be generated. Referring to the example in FIGS. 5 and 6, assuming decompression of all the pels belonging to line 3, and next starting decompression of those of the m and (m+1)th block of the luminance component, the following bits must be read from the m-th block:

K=6 bits employed for power coding,

8=bits employed for the first pixel of the portion of line 3,

C−1*N=60 bits employed for DPCM coding of remaining pixels of line 3, and 1 bit to signal that the quantizer is altered.

In this way the ADPCM Decoder block of the diagram of FIG. 3 shall have all the information required and sufficient to decompress all the 16 pel groups of each 4*16 block and belonging to the video line being subjected to the following processing.

Example of Application to a SQTV Decoder

Considering the relations shown, it is possible to define the architecture for a global memory requisite reduced to 3.1 Mbits if a 50% compression of FIELD MEMORIES is assumed. This result is reached by recompressing the fields stored upstream the NOISE REDUCTION block, according to the diagram shown in FIG. 3.

The compression is suited to the block 4*16 produced by the WINDOW GENERATOR, according to the adaptive DPCM scheme. In particular for luminance blocks 4*16 a 4 bits compression has been selected, while for chrominance 4*16 blocks, a 3 bits compression has been selected. Therefore the memory requisite of the 2 FIELD MEMORIES is: 1,620,000*2=3,240,000 bits. Considering the objective of integrating the FIELD MEMORIES in the SQTV chip without resorting to external memory devices, the above stated result enables a large savings of silicon area required for their realization.

Figure 7:
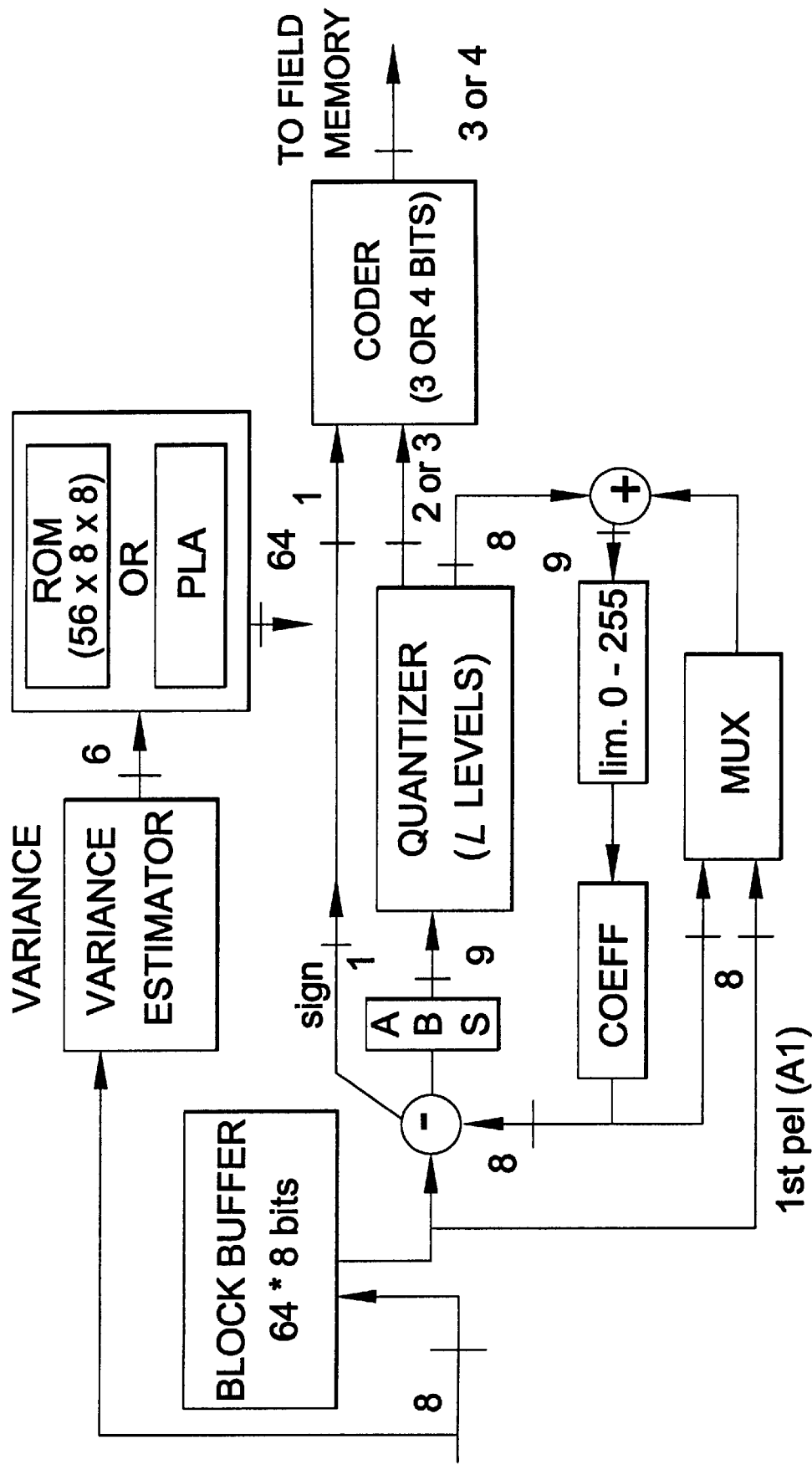
FIG. 7 is a diagram of the ADPCM coding and compressing block.

FIG. 7 shows a functional diagram of each ADPCM Encoder block. Referring to FIG. 7, the ADPCM Encoder block includes a 64*8 bit buffer (BLOCK BUFFER) for the acquisition of input data. A dedicated circuit (VARIANCE ESTIMATOR) calculates the average value of pels of each input data block and the mean of the sum of absolute values of differences between each pel of the data block. With these parameters it is possible to evaluate the input data (pels) block variance. The estimated value of the variance is used as a conditioning coefficient pointer of the quantizer (QUANTIZER) which can be pre-set and be permanently recorded in a dedicated read only memory (ROM). As an alternative, a less expensive solution may be the utilization of pre-settable combinatory logic (PLA) circuitry, to produce one or more pre-set digital values according to the variance datum applied at the input.

The DPCM compression network, suitable for generating a predictor value to apply to the relevant input of the differentiating stage (−), comprises a two-input multiplexer (MUX), at a first input of which the value of the first pel (A1) of each input data block is applied, while the predictor value produced by the network is applied to the other input. The adder stage (+) receives through a first input the output stream of the quantizer circuit (QUANTIZER) to be added to the output value of the multiplexer (MUX). The sum datum produced by the adder stage (+) is applied to the input of a limiter circuit (LIM. 0–255) whose output stream is fed to the input of a predictor value generator circuit (COEFF).

The limiter stage (LIM. 0–255) can be made of a dedicated combinatory logic circuit. The utilization of this stage becomes necessary to compensate possible straying of the maximum value of a pixel from the limit assigned, which in the case of a 8-bit coding of a pixel value, is fixed at 255. In fact, during the compression and decompression phases, the pixel value could randomly exceed the limit value of 255 and in this case the limiter circuit confines the maximum value of the pixel within the allowed limit.

A coding stage (CODER) for writing compressed data into the field memories, at three bits for chrominance data and four bits for luminance data, receives at input the output stream of the quantizer circuit (QUANTIZER) and writes data so recompressed in the relevant buffers of the field memory.

Figure 8:
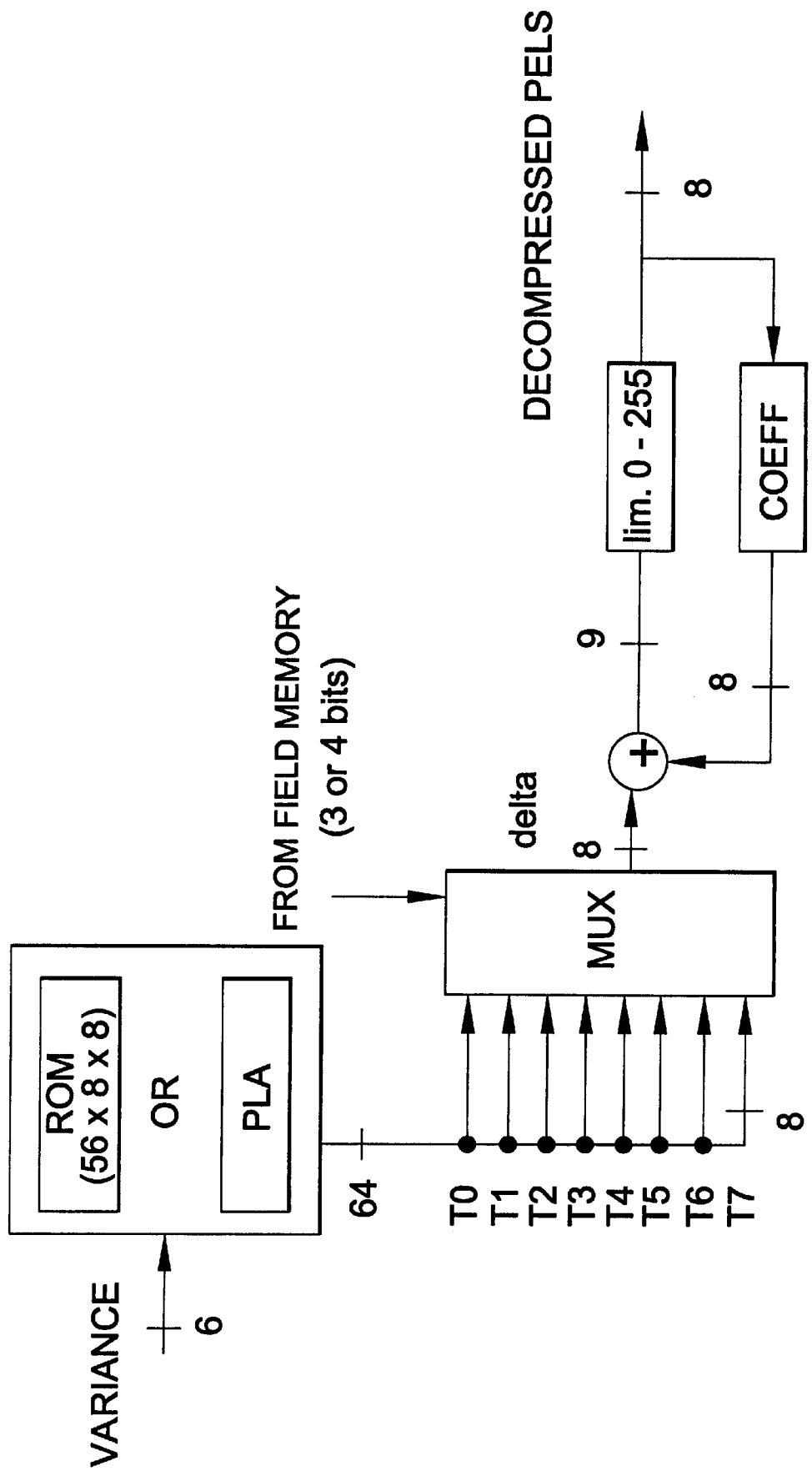
FIG. 8 is a diagram of the ADPCM decoding and decompressing block.

FIG. 8 shows a functional diagram of each ADPCM DECODER block. Assuming reading from the memory an ADPCM compressed 4*16 block of luminance data, from these a variance value is obtained which is fed to the ROM (or to the PLA) to point one of the values stored therein. The T0, T1, T2, T3, T4, T5, T6 and T7 values feeding the multiplexer MUX are thus produced. In case of luminance data decompression, the 4-bit sub-words that are obtained from the data block drive the selection of the T values by the MUX. Finally, the current T value, besides becoming the decompressed pel, becomes also the value to be added to the next value selected by the MUX. This process is initialized by the first pel of the block which is not subject to compression and decompression. Of course, the actual embodiments of the various functional blocks of the ADPCM ENCODER and of ADPCM DECODER diagrams of FIGS. 7 and 8, may be different. Practical embodiments of these functional blocks are described in the specification and drawings of the application for European Patent No. 96830106.9, filed on Mar. 11 1996, in the name of the same assignee, whose content is herein incorporated by express reference in its entirety.

Figure 9:
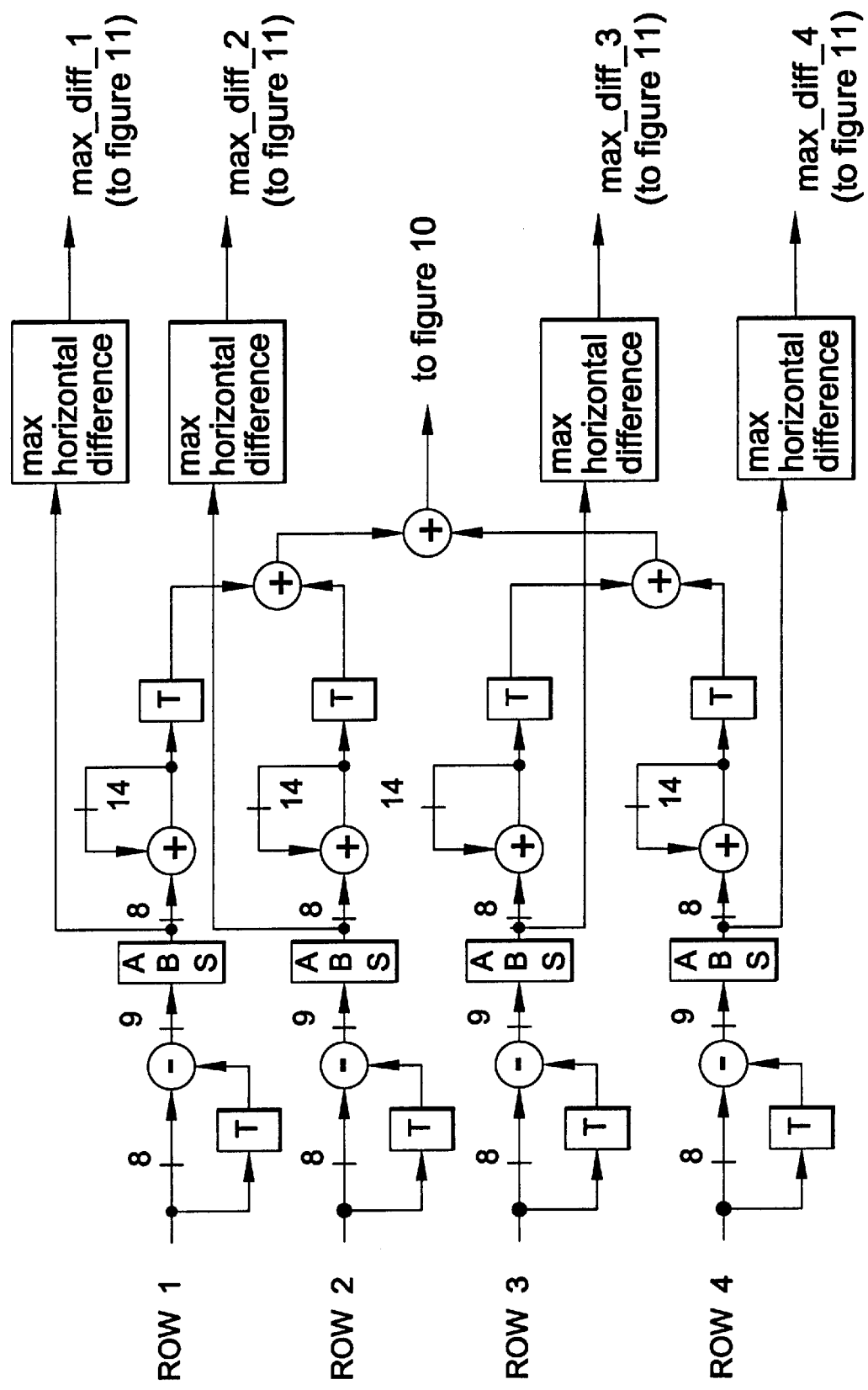
FIGS. 9, 10 and 11 show a detailed diagram of the variance evaluation block of the functional diagram of FIG. 7.
Figure 10:
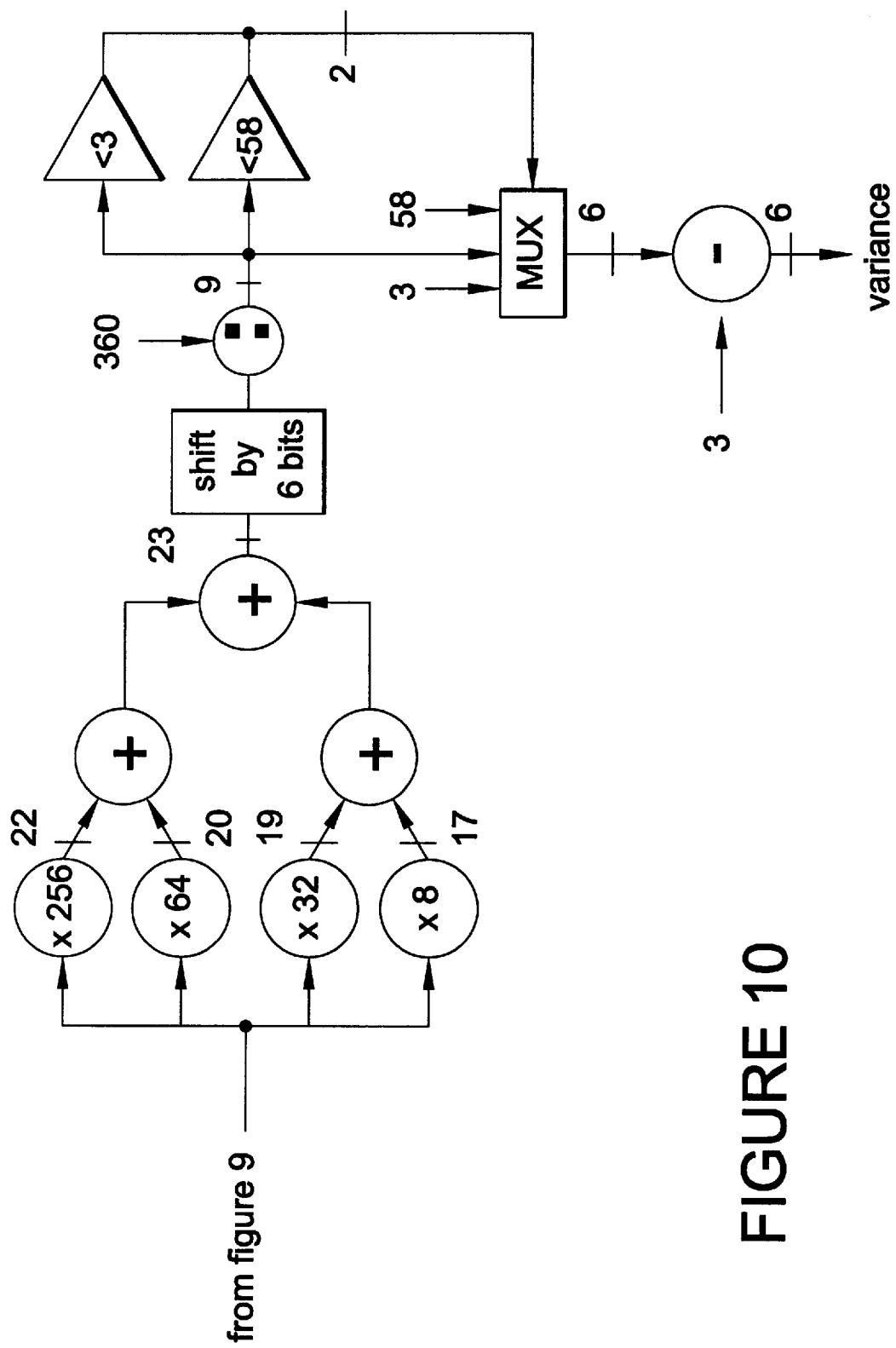
Figure 11:
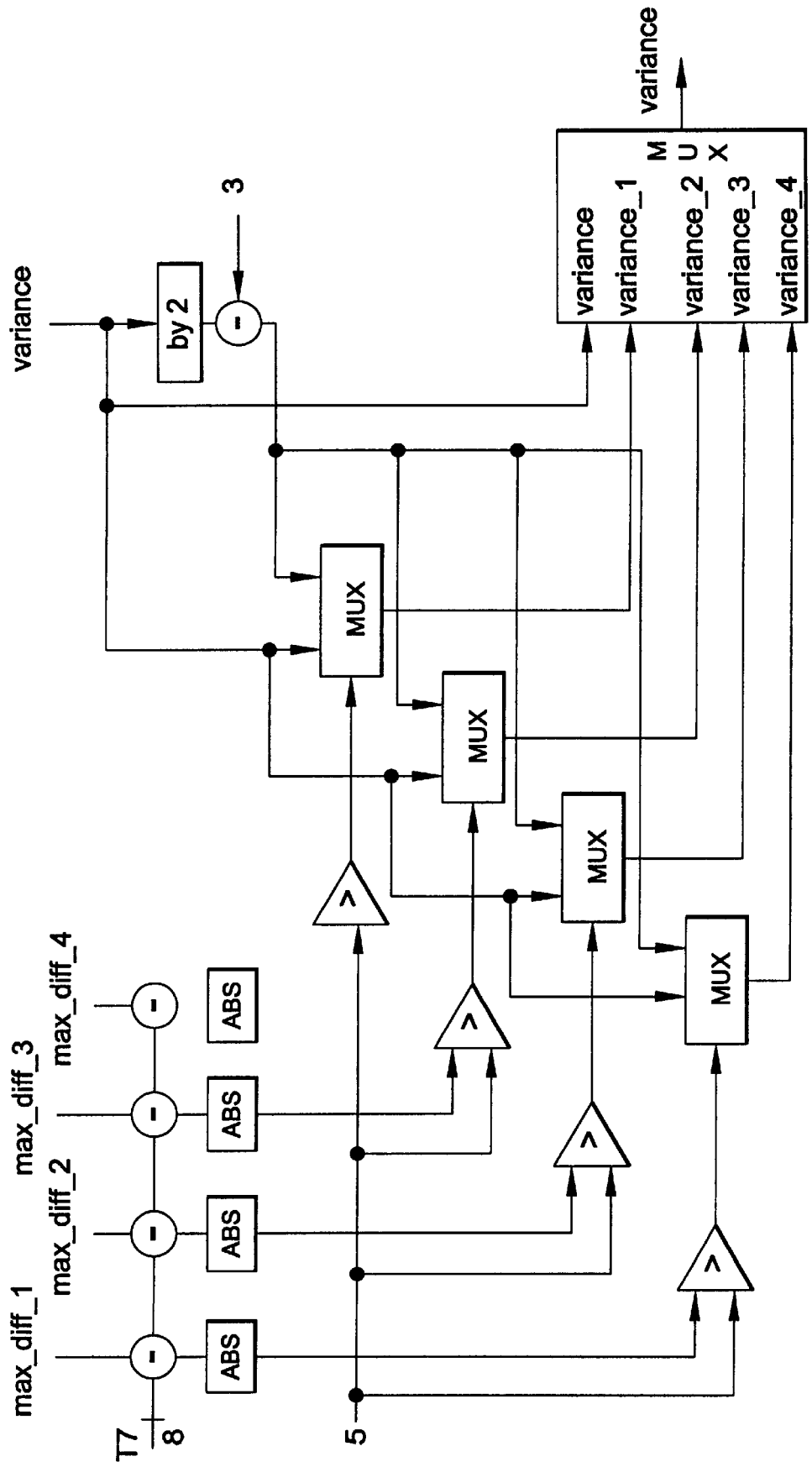

FIGS. 9, 10 and 11 show a detailed functional diagram of the VARIANCE ESTIMATOR block of FIG. 7, according to a preferred embodiment. Common functional symbols are employed in the figures and therefore they may be immediately read and understood by those of skill in the art and a reiterated definition and description of each stage forming the VARIANCE ESTIMATOR circuit is not deemed necessary for a complete understanding of the architecture or for its practical implementation.

I claim:

1. A Smart Quality Television (SQTV) processor comprising:
   an analog-to-digital converter for converting analog input video signals of luminance (Y) and of two chrominance components (U, V) to corresponding digital values;
   at least one field memory where digital blocks of luminance (Y) values and digital blocks of values of the two chrominance components (U, V) are stored;
   a First-In-First-Out register for digital values read from said at least one field memory containing pixels of a whole line of each field;
   a noise filtering block connected to an output of said First-In-First-Out register;
   a sampling frequency converter, connected to an output of said noise filtering block, for converting fields from 50 or 60 Hz to 100 or 120 Hz, respectively;
   means, connected to an output of said sampling frequency converter, for converting a vertical format;
   means, connected to an output of said means for converting, for edge definition enhancement;
   means for compressing and coding the converted video signals according to an adaptive differential pulse code modulation (ADPCM) scheme of the digital values to be stored in said at least one field memory; and
   means for ADPCM decoding and decompressing data read from said at least one field memory.

2. The processor according to claim 1, further comprising:
   a second field memory employed as a field delay for field interpolation functions for filtering pulse and gaussian noise in cooperation with said noise filtering block;
   compressing and coding means for the converted video signals according to an ADPCM compression scheme of the digital signals to store same in said second field memory; and
   ADPCM means of decoding and decompressing for data read from said second field memory.

3. The processor according to claim 2, wherein said at least one field memory and said second field memory are defined in at least one external DRAM device.

4. The processor according to claim 2, wherein said processor is integrated on a chip; and wherein said at least one field memory and said second field memory are also integrated on the same chip as the processor.

5. A video processor comprising:
   an analog-to-digital converter for converting analog input video signals of luminance (Y) and of two chrominance components (U, V) to corresponding digital values;
   at least one field memory where digital blocks of luminance (Y) values and digital blocks of values of the two chrominance components (U, V) are stored;
   a register for digital values read from said at least one field memory containing pixels of a whole line of each field;
   a noise filtering block connected to an output of said register;
   a sampling frequency converter, connected to an output of said noise filtering block, for converting fields from a first frequency to another;
   means for compressing and coding the converted video signals according to an adaptive differential pulse code modulation (ADPCM) scheme of the digital values to be stored in said at least one field memory; and
   means for ADPCM decoding and decompressing data read from said at least one field memory.

6. The processor according to claim 5, further comprising:
   a second field memory employed as a field delay for field interpolation functions for filtering pulse and gaussian noise in cooperation with said noise filtering block;
   compressing and coding means for the converted video signals according to an ADPCM compression scheme of the digital signals to store same in said second field memory; and ADPCM means of decoding and decompressing for data read from said second field memory.

7. The processor according to claim 6, wherein said at least one field memory and said second field memory are defined in at least one external DRAM device.

8. The processor according to claim 6, wherein said processor is integrated on a chip; and wherein said at least one field memory and said second field memory are integrated on the same chip as the processor.

9. The processor according to claim 5, further comprising means, connected to an output of said sampling frequency converter, for converting a vertical format, and means, connected to said means for converting, for edge definition enhancement.

* * * * *